United States Patent [19]

Shisgal et al.

[11] Patent Number: 5,004,997
[45] Date of Patent: Apr. 2, 1991

[54] PARKING AID DEVICE

[75] Inventors: Ben Z. Shisgal, Carmiel; Tzvi Tzelnick, Tel Aviv, both of Israel

[73] Assignee: Insys Ltd., Carmiel, Israel

[21] Appl. No.: 468,292

[22] Filed: Jan. 22, 1990

[51] Int. Cl.$^5$ .......................... B60Q 1/00; G08G 1/14
[52] U.S. Cl. .................................... 340/436; 340/435; 340/932.2; 340/309.15; 364/424.01; 364/461
[58] Field of Search ............ 340/436, 435, 958, 932.2, 340/309.15, 903; 364/424.01, 461, 467

[56] References Cited

U.S. PATENT DOCUMENTS

| | | | |
|---|---|---|---|
| 3,114,123 | 12/1963 | Ljungman et al. | 340/932.2 |
| 3,360,775 | 12/1967 | Schroeder | 340/436 |
| 3,376,547 | 4/1968 | Auei, Jr. | 340/932.2 |
| 3,437,988 | 4/1969 | Vachon et al. | 340/932.2 |
| 3,775,741 | 11/1973 | Zechnowitz et al. | 340/958 |
| 4,603,390 | 7/1986 | Mehdipour et al. | 340/932.2 |

FOREIGN PATENT DOCUMENTS 2197100  5/1988  United Kingdom ............. 340/932.2

Primary Examiner—Donnie L. Crosland
Attorney, Agent, or Firm—Browdy and Neimark

[57] ABSTRACT

An electronic parking-aid device for guiding a motorist when parking a vehicle in a parking bay. The device includes a transmitter and receiver which respectively transmits a signal towards the front of an approaching vehicle and receives the signal reflected thereby. A computing apparatus coupled to the transmitter and receiver for computing the distance from the front of the vehicle to the device and a logic apparatus coupled to the computing apparatus compares the computed distance with a predetermined threshold so as to generate an output signal if the computed distance is less than the threshold. The logic apparatus compares the computed distance to two different thresholds so as to generate corresponding output signals if the computed distance is less than the lower threshold, or lies between the two thresholds, or is greater than the larger threshold. Red, amber and green indication lamps are connected to the logic apparatus and are responsive to the respective output signals so as to advise a motorist when he is safe to proceed, when he should proceed with caution, and when he should stop, respectively. Also a parking management system wherein each parking bay is provided with a parking-aid device for monitoring whether a respective parking bay is occupied or vacant.

17 Claims, 4 Drawing Sheets

PARKING AID DEVICE

FIELD OF THE INVENTION

This invention relates to a parking-aid device for guiding a motorist when parking a vehicle in a parking bay.

BACKGROUND OF THE INVENTION

The problems associated with parking vehicles accurately in parking bays having restricted lengths has long been recognised. Thus, in a parking bay having a wall at a far end thereof, a motorist is obliged to park his vehicle sufficiently close to the wall such that the rear end of his vehicle does not protrude beyond the opposite end of the parking space. At the same time, there exists the danger that as the motorist approaches the end wall, he may misjudge the distance between the front bumper of his vehicle and the end wall, with the consequent risk that he will actually drive his vehicle against the end wall, with obvious results. This problem is particularly acute when the parking bay is closed in as, for example, when constituted by a garage and is further exacerbated when the front end of the vehicle is long, which increases the difficulty of judging the distance from the front bumper to the end wall of the garage.

One known solution to the above problem is to provide a ramp inside the parking bay and displaced from the end wall by a pre-calibrated distance, such that when the front wheels of the motor vehicle meet the ramp, the front bumper of the motor vehicle is satisfactorily positioned with respect to the end wall. There are several drawbacks to such an arrangement. First, the position of the ramp has to be calibrated according to the distance of the front wheels of the motor vehicle from the front bumper and, consequently, a ramp which is suitable for one vehicle is not suitable for a different vehicle. Furthermore, the motorist is obliged to drive forward into the parking bay, requiring that he reverse out therefrom, even though it is often desirable to reverse into the parking bay. This limitation derives from the fact that the distance of the front wheels from the front bumper is usually different from the distance of the rear wheels from the rear bumper.

Such an arrangement also requires that where two vehicles are parked in a double width garage, two separate ramps have to be provided, one for each vehicle, and the two vehicles are obliged always to occupy their own spaces. This applies equally when two vehicles are parked in a double length garage, one behind the other, where the drawback is even more significant since, in these circumstances, the rear vehicle is obliged to await the arrival of the forward vehicle, which is by no means always convenient.

Another proposed solution is to suspend a ping-pong ball from a string in the roof of the garage, at a suitable height and distance from the end wall, such that when the ping-pong ball strikes the windshield of the motor vehicle, this serves as an indication to the motorist to stop. However, such an arrangement suffers from all the drawbacks described above with relation to the use of a ramp plus the additional drawback that the parking bay must be provided with a roof, which renders such a proposal suitable for use with garages only.

Yet another proposal has been to affix buffers to the end wall of the parking bay at the same height as the vehicle's front bumper and this again may require that the buffer be calibrated from one vehicle to another. This drawback, in itself, is not so serious so far as motor cars are concerned, since the front buffers of most motor cars are substantially at the same height. However, the provision of buffers in such manner also reduces the effective length of the parking bay, which can sometimes be critical when space is at a premium and, more serious, since the motorist only receives an indication to stop the vehicle when he has actually driven it into the buffer, there exists the inevitable danger that he will drive into the buffer at too great a speed, with obvious results.

SUMMARY OF THE INVENTION

It is an object of the invention to provide a device for guiding a motorist when parking a vehicle in a parking bay, in which the drawbacks associated with hitherto proposed solutions are substantially reduced or eliminated.

According to a broad aspect of the invention, there is provided an electronic parking-aid device for guiding a motorist when parking a vehicle in a parking bay, the device comprising:

a housing adapted to be fixed to a wall at an end of the parking bay and containing therein means for connecting to a source of electric power, transmitter means for transmitting a first signal towards an approaching vehicle so as to reflect a second signal from a front of the vehicle, receiver means for receiving the second signal, computing means coupled to the transmitting and receiving means and responsive to the first and second signals for computing the distance of the front of the vehicle from the wall, logic means coupled to the computing means for comparing the computed distance with a first predetermined threshold and generating a first output signal if the computed distance is less than the first threshold, and first indication means coupled to the logic means and responsive to the first output signal for indicating to the motorist when to stop.

According to a further aspect of the invention, there is provided an integrated parking management system, comprising:

a plurality of parking bays, a like plurality of sensor means responsive to the presence of a vehicle within the parking bay for providing a first sensor signal and responsive to the absence of a vehicle within the parking bay for providing a second sensor signal, monitoring means coupled to each of the sensor means and responsive to the second sensor signals for monitoring which of said parking bays are vacant, timing means coupled to each of the sensor means and responsive to the first sensor signals for measuring elapsed time intervals during which the respective bays have been occupied, and reset means coupled to each of the sensor means and responsive to the second sensor signals for resetting the respective timing means.

Preferably, the logic means operates in two stages so as to compare the computed distance with first and second predetermined thresholds and to provide respective output signals for illuminating green, amber and red lights indicating to the motorist that it is safe to proceed, that he should proceed with caution and that he should stop, respectively. Additionally, threshold adjustment means may be provided for adjusting one or more of the predetermined thresholds according to the specific requirements of the motorist.

Such an embodiment provides a visible warning to the motorist, employing the traffic light sequence which is, of course, familiar to all motorists; is completely independent of the length of the vehicle; and easily lends itself to pre-calibration by the motorist according to his or her own driving expertise, should this be considered necessary.

Preferably, the parking management system according to the invention employs a plurality of parking-aid devices in order to monitor whether a respective parking bay is occupied or vacant. This information is linked via a respective monitoring means on each level of the parking management system to a central control system at the entry level thereof. The central control system is thus able to monitor the status of the complete system, to allocate the closest available parking bay to an incoming motorist and also to trigger the parking-aid device in the allocated bay so that an indicator light flashes within the parking-aid device, thereby guiding the motorist to the correct parking bay. Additionally, timing means coupled to each parking bay and responsive to the presence of a vehicle therein are adapted to calculate the elapsed time during which the respective parking bay has been occupied, the central control system being coupled to each of the timing means for calculating the parking fee based on a predetermined tariff.

BRIEF DESCRIPTION OF THE DRAWINGS

The invention will now be described, by way of non-limiting example only, with regard to an electronic parking-aid device for guiding a motorist when parking a vehicle in a parking bay and with reference to the accompanying drawings, in which.

DETAILED DESCRIPTION OF PREFERRED EMBODIMENTS

Figure 1:
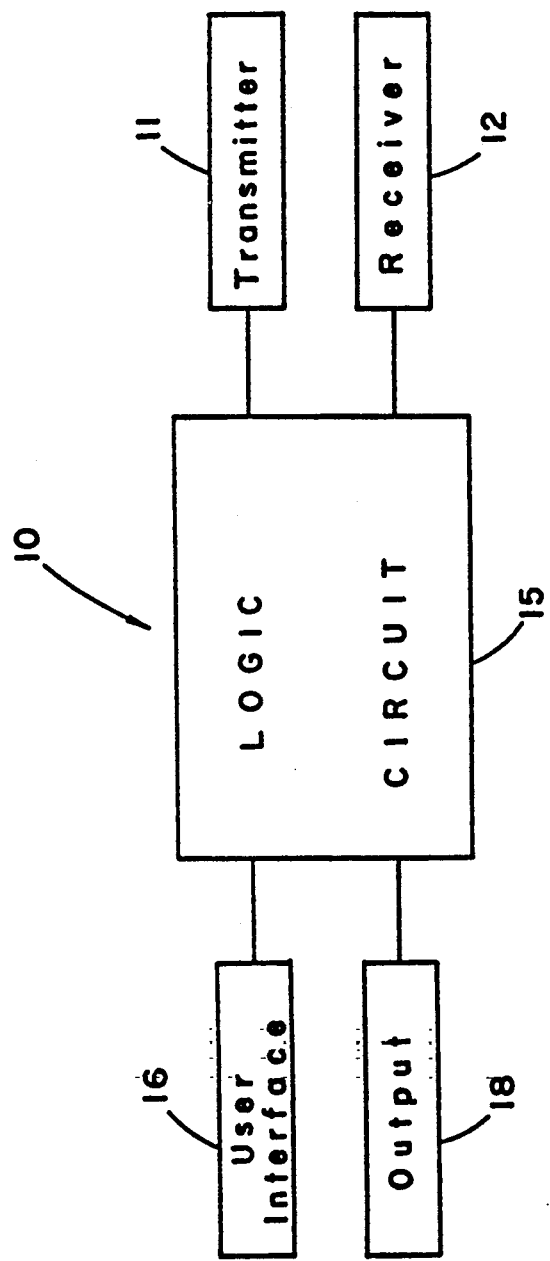
FIG. 1 is a block diagram showing functionally a parking-aid device according to the invention.

Referring to FIG. 1 of the drawings, there is shown functionally the main components of a parking-aid device 10 according to the invention. The parking aid device 10 comprises an ultrasonic transmitter 11 for transmitting a first signal towards an approaching vehicle (not shown) so as to reflect a second signal from a front of the vehicle. An ultrasonic receiver 12 is adapted to receive the second signal, thereby permitting a computer 15 coupled to both the transmitter 11 and the receiver 12 to calculate the distance of the front of the vehicle from the parking-aid device 10 by means of triangulation. Stored within a memory (not shown) of the computer 15 is a first threshold and a second threshold greater than the first threshold, the computer 15 being adapted to compare the measured distance with the first and second thresholds, as will be explained below with reference to FIG. 2 of the drawings.

A user interface 16 connected to the computer 15 permits the motorist to alter either or both of the first and second thresholds and an output 18 from the computer 15 is adapted to indicate to the motorist when it is safe for him to proceed and when he should stop his vehicle.

The computer 15 includes a microprocessor which is programmed to evaluate the distance between the front of the vehicle and the parking-aid device 10 and also to perform the comparisons between the measured distance and the first and second predetermined thresholds.

If no second signal is received by the receiver 12, this is indicative of the fact that the area in front of the parking-aid device 10 is unoccupied. A timer (not shown) within the computer 15 is adapted to measure the elapsed time during which no second signal is received by the receiver 12 and to cut of the supply of electric power to the parking-aid device 10 in the event that no second signal has been received for longer than 10 seconds. By this means, electric power is conserved and this is particularly important when the parking-aid device 10 is powered by an internal battery.

The user interface 16 contains a photo-detector (not shown) which constitutes an initialization sensor responsive to a flash of light from the vehicle's headlamps for switching on the device 10 following a power interruption as explained above.

Figure 2:
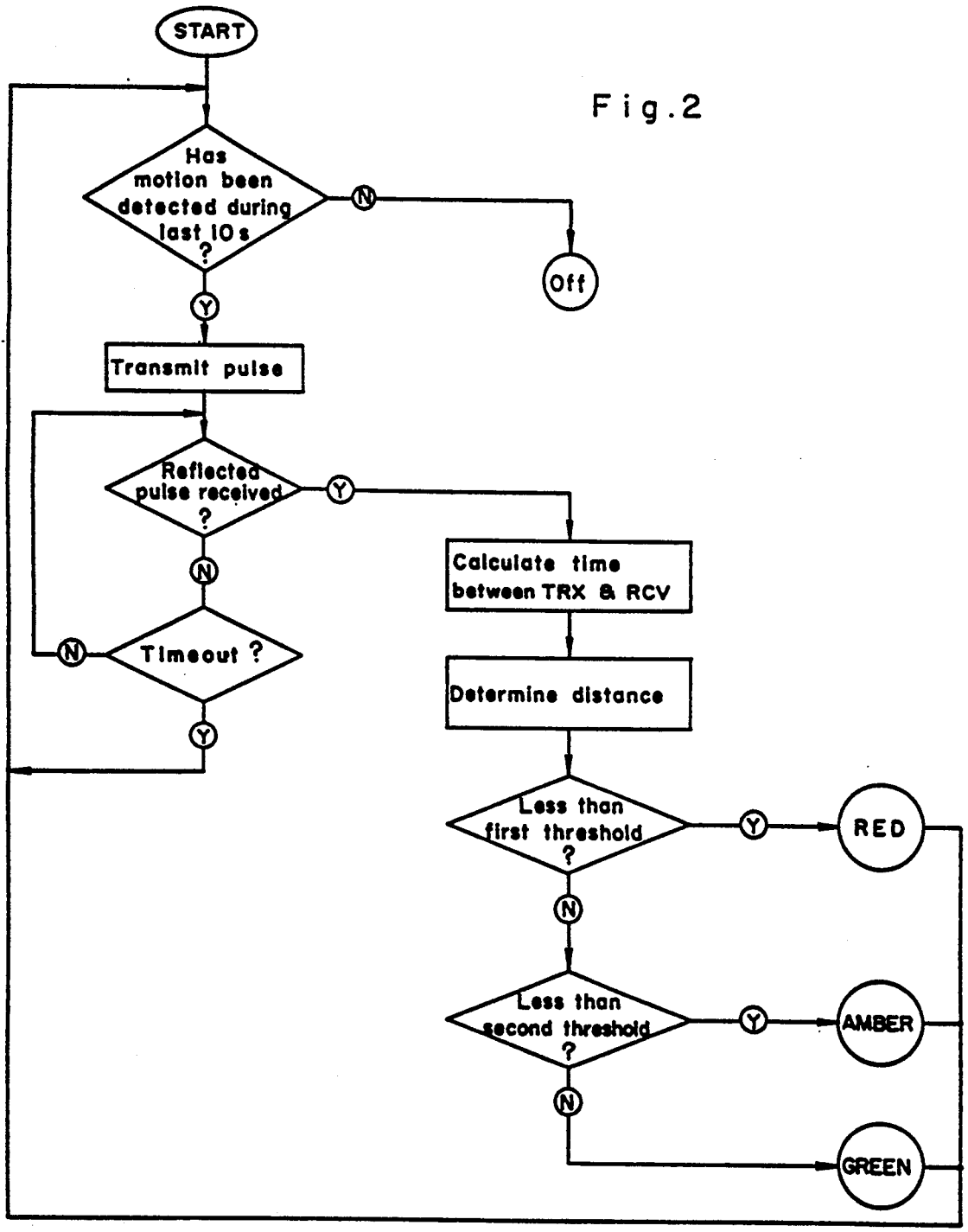
FIG. 2 is a flow diagram showing the operation of a preferred embodiment of the invention.

Referring now to FIG. 2, there are shown the principal program steps for operating the computer 15. Thus, at the start of the procedure the computer is adapted to check whether motion has been detected during the previous 10 seconds and, if not, to switch off the power to the system, thereby conserving energy.

When a vehicle approaches the parking-aid device 10 and the motorist flashes the vehicle's headlamps, the initialization sensor restores the power to the device 10, the transmitter 11 immediately transmitting a pulse towards the front of the vehicle. If, for any reason, no reflected pulse is received, a further timing sequence is initiated whereby the computer 15 continues to monitor the output of the receiver 12 for a second signal for a limited period of time after which, if a second signal is still not received, the algorithm restarts.

On receipt of a second signal, the computer 15 calculates the time between the transmitted and received pulses (TRX and RCV, respectively) and determines the distance between the device 10 and the front of the car.

Stored within the computer memory is a first threshold corresponding to the minimum permitted distance between the front of the vehicle and the end wall of the garage to which the device 10 is fixed and a second threshold, larger than the first threshold, corresponding to a distance between the front of the vehicle and the end wall of the garage which is sufficiently short to warrant caution on the part of the motorist. The measured distance is compared with the first threshold and if it is less than the first threshold a red light is illuminated, warning the motorist to stop immediately. If the measured distance is not less than the first threshold, it is compared with the second threshold and, if it is less than the second threshold, an amber light is illuminated warning the motorist that he is approaching the stopping zone defined by the first threshold and that he should therefore proceed with caution.

If the measured distance is not less than the second threshold, a green light is illuminated indicating to the motorist that he is well clear of the stopping zone and may proceed with normal due care and attention.

It will be understood that FIG. 2 shows only the principal steps of the computer program and that many other embodiments are possible without in any way departing from the spirit of the invention. Thus, there may also be stored within the computer memory a third threshold between the first and second thresholds, such that when the vehicle enters the zone between the third and first thresholds, the amber light flashes so as to provide an additional warning to the motorist that he is very close indeed to the stopping zone.

The user interface also permits the motorist to adjust the values of the threshold stored within the computer memory according to his own personal requirements. The computer 15 is programmed such that, by default, the green lamp is illuminated when the measured distance exceeds 3 m. The amber lamp is continuously illuminated for distances less than 3 m but greater than 1 m and flashes on and off when the measured distance is less than 1 m but greater than 20 cm. When the measured distance is less than 20 cm the red lamp becomes illuminated.

Whilst in the preferred embodiment, the transmitter 11 and the receiver 12 are constituted by an integrated ultrasonic detector, it will clearly be understood that U.V. detectors, infrared detectors and so on, are equally suitable.

Furthermore, whilst the parking-aid device 10 has been described with particular reference to private use in a motorist's garage, it will be understood that the device has application for parking management systems in general, as will now be described with reference to FIG. 3 of the drawings.

Figure 3:
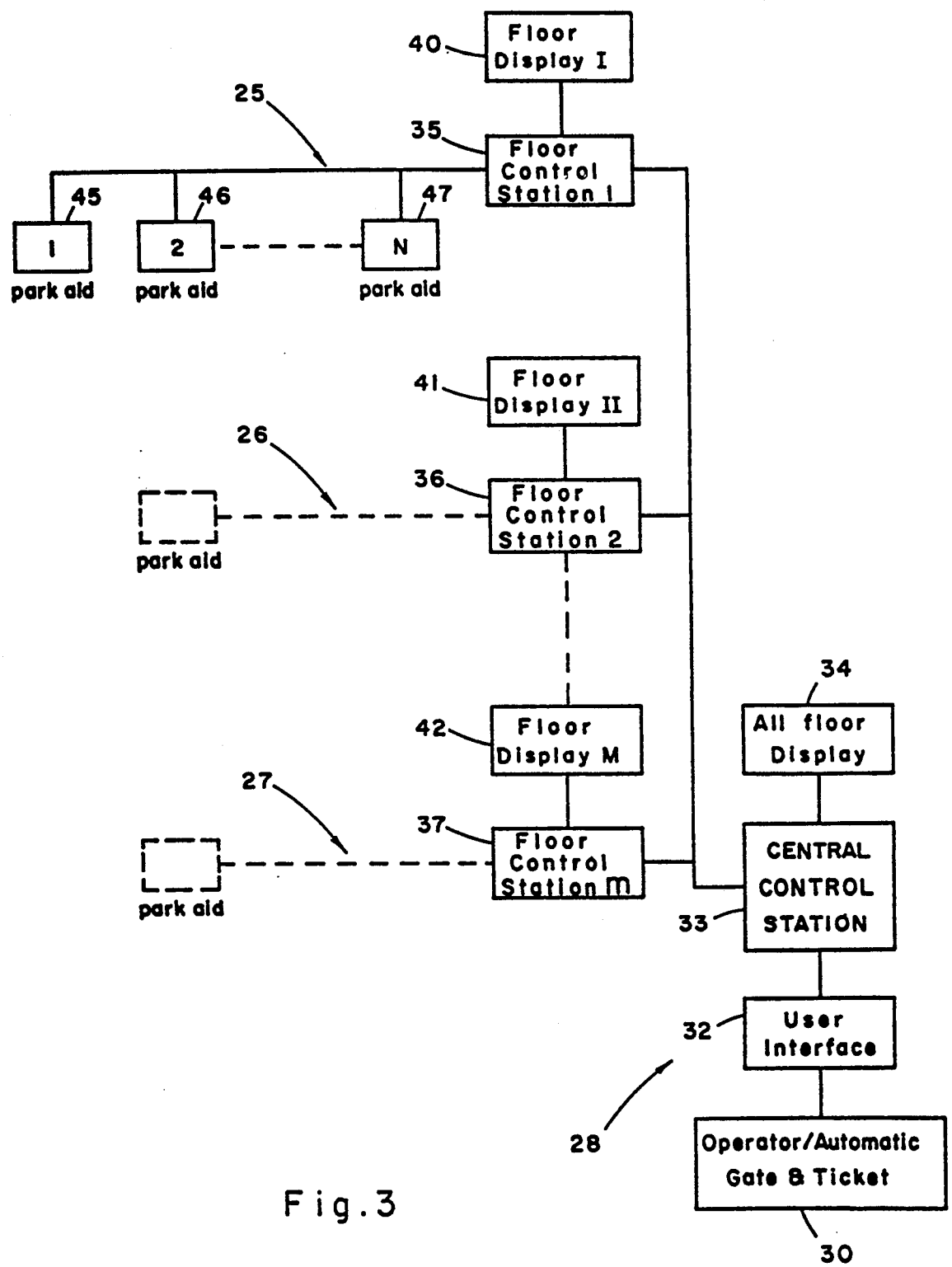
FIG. 3 is a block diagram showing schematically an integrated parking management system employing a plurality of parking-aid devices according to the invention.

Thus, FIG. 3 shows schematically such an integrated parking management system according to the invention. There are provided a plurality of parking levels designated generally as 25, 26 and 27, respectively. Additionally, there is shown an entry level 28 having an OPERATOR/AUTOMATIC GATE AND TICKET DISPENSER 30 coupled by a USER INTERFACE 32 to a CENTRAL CONTROL STATION 33. The CENTRAL CONTROL STATION 33 is coupled to a DISPLAY MONITOR 34 as well as to respective FLOOR CONTROL STATIONS 35, 36 and 37 in each of the parking levels 25, 26 and 27, respectively. The FLOOR CONTROL STATIONS 35, 36 and 37 are coupled to respective FLOOR DISPLAY MONITORS 40, 41 and 42.

On each of the parking levels 25, 26 and 27 there are a plurality of parking bays such as 45, 46 and 47 on the first parking level 25, each being provided with a parking-aid device according to the invention at an extremity thereof. Where a wall is located towards the far end of a parking bay, the parking-aid device may suitably be fixed to the wall at such a height as to be easily visible to the motorist and so directed as to transmit a signal to the front of the vehicle and easily to receive the signal reflected thereby. Where a wall is not provided at the far end of the parking bay, the parking-aid devices may be fixed to a pole provided at the far end at a suitable height.

Each of the FLOOR CONTROL STATIONS 35, 36 and 37 has stored therein a layout of all the parking bays corresponding to the respective levels 25, 26 and 27. They also constitute monitoring means for monitoring the respective status, i.e. occupied or empty, of each of the parking bays under its control. Thus, for example, the FLOOR CONTROL STATION 35 monitors each of the parking bays 45, 46 and 47 under its control for establishing whether they are empty or occupied. Each of the parking bays 45, 46 and 47 is allocated a number, N, which varies from $N=1$ to $N=N_{MAX}$ such that the parking bay nearest to the entry to the corresponding level is assigned the number $N=1$, whilst the parking bay remotest from the entry is assigned the number $N=N_{MAX}$. Likewise, each of the levels is assigned a number, F, which varies from $F=1$ to $F=F_{MAX}$, the lowest level being assigned the number $F=1$ and the top level being assigned the number $F=F_{MAX}$.

The FLOOR CONTROL STATION 35 thus monitors sequentially each of the parking bays 45, 46 and 47 so as to display on the FLOOR DISPLAY 40 a pictorial layout of the level 25 indicating which bays are occupied and which are empty. The FLOOR CONTROL STATIONS 36 and 37 operate likewise and the CENTRAL CONTROL STATION 33 monitors the whole system so as to display on the FLOOR DISPLAY MONITOR 34 a pictorial layout of the complete parking system, together with an indication of which bays on each level are occupied and which are vacant.

The FLOOR CONTROL STATIONS 35, 36 and 37 constantly monitor the respective bays 25, 26 and 27 so as to determine not only which bays are vacant and which are occupied but, moreover, which bays have only just been vacated. They are also adapted to measure the time interval during which a bay is occupied, corresponding to the elapsed time between the bay becoming occupied and its subsequently becoming vacant, and the CENTRAL CONTROL STATION 33 is then able to calculate the parking fee based on the measured time and one or more predetermined tariffs.

Figure 4:
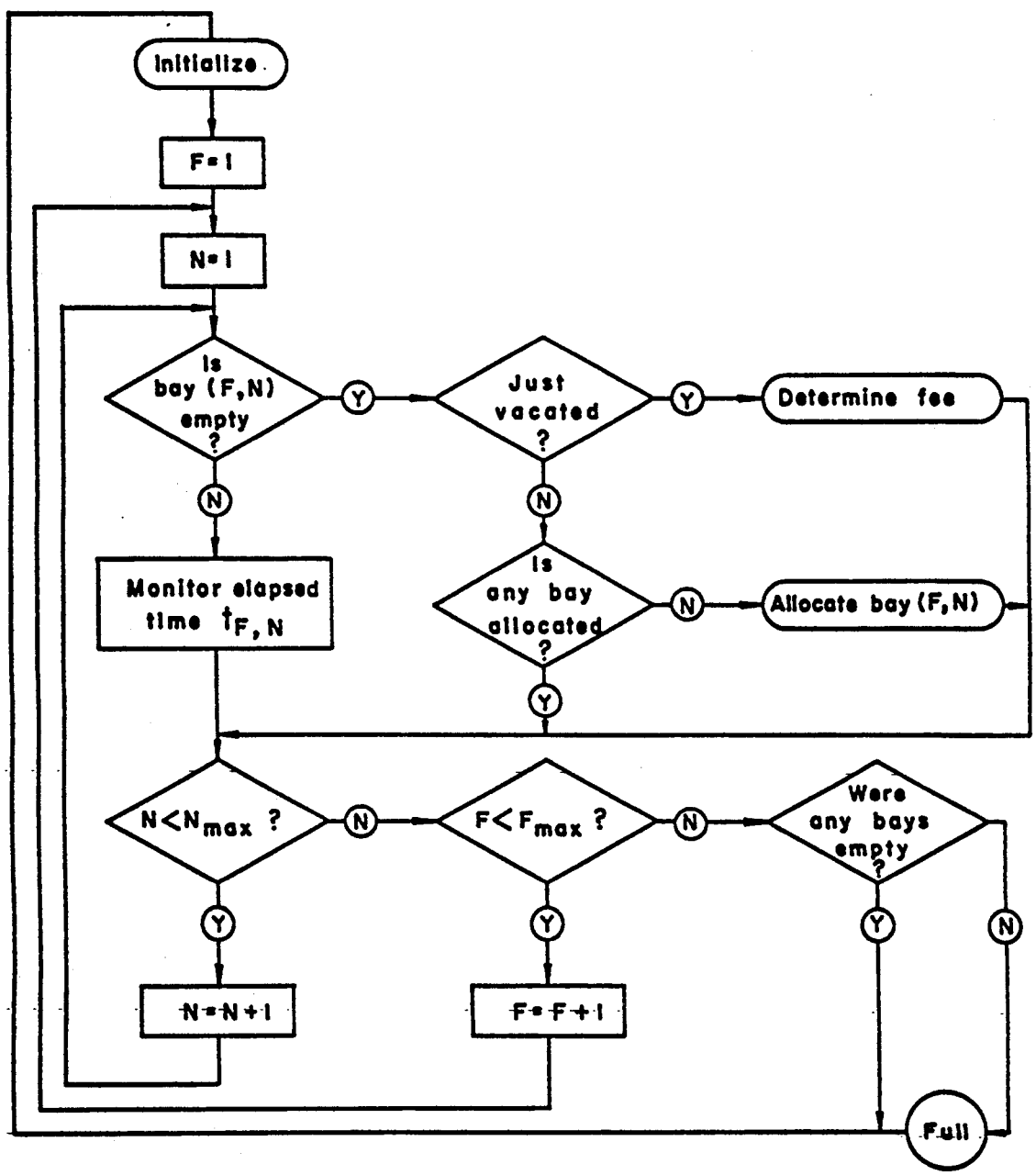
FIG. 4 is a flow diagram showing the principal operative steps in the system illustrated in FIG. 3.

Referring to FIG. 4, there are shown the principal steps in an algorithm for use with the parking management system described above with reference to FIG. 3 of the drawings. During an INITIALIZATION step, the FLOOR CONTROL STATIONS 35, 36 and 37 monitor the status of each of the respective floors 25, 26 and 27 so as to determine which bays, e.g. 45, 46 and 47 are occupied and which are empty. This information is available to the CENTRAL CONTROL STATION 33 which, for each of the floors in turn, i.e. $F=1$ to $F=F_{MAX}$ determines for each bay $N=1$ to $N=N_{MAX}$ whether the bay is occupied or empty. If a bay is found to be empty, then its status is compared with its former status on a preceding cycle so as to determine whether the bay was also empty in the previous cycle. When a bay is found to have been occupied on a previous cycle and is subsequently found to be empty, this is an indication that the bay in question was just vacated. The parking fee is then determined according to any predetermined criteria stored in the CENTRAL CONTROL STATION 33.

When an empty bay is determined not to have been just vacated, i.e. it was also empty during the previous cycle, an ALLOCATING SUBROUTINE checks whether a bay is allocated in the complete parking system. As was explained above, a bay is allocated according to its proximity to the entry barrier so that each bay in turn is occupied in the shortest possible time. There will always exist an allocated bay so long as there are empty bays in the parking system but, regardless of the number of empty bays, there will only ever be one allocated bay. If no bay is found to be allocated, and the currently monitored bay is found to have just been vacated, then this bay is allocated whereby it will become the next bay to be occupied.

If the currently monitored bay, i.e. BAY (F,N) is found to be occupied, then the elapsed time $t_{F,N}$ during which the bay has so far been occupied is monitored, so that when the bay is eventually vacated the measured elapsed time constitutes the accumulated time during which the bay was occupied. This procedure is then repeated for all the bays in each level and for all the levels themselves. If, at the end of a cycle, it is found that no bays were empty, the CENTRAL CONTROL STATION 33 displays on the DISPLAY MONITOR 34 a message to the effect that the parking lot is full.

It will be understood that the algorithm shown in FIG. 4 shows only the rudimentary steps associated with the parking system described with reference to FIG. 3. In particular, the ALLOCATION ROUTINE is actually more sophisticated than shown in FIG. 4. Thus, if, on vacation of a previously occupied bay, a different bay is found to be allocated, then the ALLOCATION ROUTINE is adapted to check the bay designation, i.e. (F,N) of the allocated bay with that of the recently vacated bay so as to determine which designation (F,N) corresponds to the shortest route from the entry barrier. If the allocated bay is on a lower level than the recently vacated bay or, if it is on the same level but its bay number N is smaller, then the ALLOCATION ROUTINE makes no changes to the allocated bay. If, on the other hand, the recently vacated bay has a lower floor number F than the allocated bay, or if it is on the same level but has a smaller bay number N, then the ALLOCATION ROUTINE substitutes the recently vacated bay for the allocated bay. In this manner, the ALLOCATION ROUTINE ensures that the allocated bay is always the bay with the shortest route to the entry barrier.

The parking management system described with reference to FIGS. 3 and 4 of the drawings is clearly based on the ability constantly to monitor each of the respective parking bays so as to determine whether they are empty or occupied. Whilst in the preferred embodiment this information is provided by means of the parking-aid device described in detail with reference to FIGS. 1 and 2 of the drawings, it will be understood that it may equally be provided by any other means, e.g. pressure sensors, photodetectors and so on. It will also be apparent that many modifications can be made to the parking system and that the algorithm described with reference to FIG. 4 of the drawings is merely representative of a practical method for operating the system.

Thus, in accordance with the invention, there is provided an adjustable parking-aid device for guiding a motorist when parking his vehicle so that he can safely and reliably bring his vehicle to a stop within a predetermined distance of the parking-aid device. Additionally, whilst this has obvious practical benefits to motorists parking their vehicles on their own private premises, it has equal application to municipal car parks and the like, wherein information relating to occupancy or vacancy of parking bays may be derived from respective parking-aid devices in each parking bay, thereby permitting effective management of the complete system to be performed.

We claim:

1. An electronic parking-aid device for guiding a motorist when parking a vehicle in a parking bay, the device comprising:

a housing adapted to be fixed to a wall at an end of the parking bay and containing therein means for connecting to a source of electric power, transmitter means for transmitting a first signal towards an approaching vehicle so as to reflect a second signal from an approaching surface of the vehicle, receiver means for receiving the second signal, computing means coupled to the transmitting and receiving means and responsive to the first and second signals for computing the distance of the approaching surface of the vehicle from the wall, logic means coupled to the computing means for comparing the computed distance with a first predetermined threshold and generating a first output signal if the computed distance is less than the first threshold, and first indication means coupled to the logic means and responsive to the first output signal for indicating to the motorist to stop.

2. A device according to claim 1, wherein:

the logic means is adapted to generate a second output signal if the computed distance is not less than the first threshold, and there is provided a second indication means coupled to the logic means and responsive to the second output signal for indicating to the motorist that he is safe to proceed.

3. A device according to claim 1, wherein:

the logic means is adapted to compare the computed distance with a second predetermined threshold greater than the first threshold and to generate a third output signal if the computed distance is not less than the first threshold and is less than the second threshold and a fourth output signal if the computed distance is not less than the second threshold, and there is further provided:

a third indication means coupled to the logic means and responsive to the third output signal for indicating to the motorist that he should proceed with caution, and a fourth indication means coupled to the logic means and responsive to the fourth output signal for indicating to the motorist that he is safe to proceed.

4. A device according to claim 3, wherein the or each indication means is a visible display.

5. A device according to claim 4, wherein the logic means includes:

a first comparator for comparing the computed distance with the first predetermined threshold and for generating the first output signal if the computed distance is less than the first threshold and for generating the second output signal otherwise, and a second comparator coupled to the first comparator and responsive to the second output signal for generating the third output signal if the computed distance is not less than the first threshold and is less than the second threshold and for generating the fourth output signal otherwise;

the first, third and fourth indication means being red, amber and green lights respectively.

6. A device according to claim 5, wherein:

the logic means is further adapted to compare the computed distance with a third predetermined threshold between the first and second thresholds and to interrupt the third output signal if the computed distance is not less than the first threshold and is less than the third threshold;

whereby the amber light flashes prior to illumination of the red light.

7. A device according to claim 5, further including:

a timer coupled to the receiver for measuring a time period during which no second signal is received thereby, a third comparator for comparing the measured time period with a fourth predetermined threshold and for generating a cut-off signal if the measured time period exceeds the fourth threshold, and a switching circuit responsive to the cut-off signal for interrupting the supply of electric power to the or each indication means.

8. A device according to claim 7, wherein:

the switching circuit is adapted to interrupt the supply of electric power to the transmitter, receiver, computing and logic means in response to the cut-off signal, there is further provided an initialization sensor coupled to the switching circuit and being operative when said supply of electric power is interrupted for generating an initialization signal in response to an activation signal transmitted by the motorist, and the switching circuit is responsive to the initialization signal for restoring said supply of electric power.

9. A device according to claim 7, wherein:

the switching circuit is adapted to interrupt the supply of electric power in the computing means and in the logic means in response to the cut-off signal and to restore said supply to the computing means, logic means and indication means in response to said second signal.

10. A device according to claim 1, wherein the transmitter and receiver means are an integral unit.

11. A device according to claim 1, wherein the source of electric power is at least one battery accommodated within the housing.

12. A device according to claim 4, further including threshold adjustment means for adjusting at least one of the thresholds.

13. An integrated parking management system comprising:

a plurality of parking bays each having at an extremity thereof a respective parking-aid device, including:

a housing adapted to be fixed at said extremity and containing therein means for connecting to a source of electric power, transmitter means for transmitting a first signal towards an approaching vehicle so as to reflect a second signal from an approaching surface of the vehicle, receiver means for receiving the second signal, computing means coupled to the transmitting and receiving means and responsive to the first and second signals for computing the distance of the approaching surface of the vehicle from said extremity, logic means coupled to the computing means for comparing the computed distance with a first predetermined threshold and a second predetermined threshold much greater than the first threshold and generating a first output signal if the computed distance is less than the first threshold and a second output signal if the computed distance is greater than the second threshold, and first indication means coupled to the logic means and responsive to the first output signal for indicating to the motorist to stop;

the system further comprising:

monitoring means coupled to each of the parking-aid devices and responsive to the second output signals for monitoring which of said parking bays are vacant, timing means coupled to each of the parking-aid devices and responsive to the first output signals for measuring elapsed time intervals during which the respective bays have been occupied, and reset means coupled to each of the parking-aid devices and responsive to the second output signals for resetting the respective timing means.

14. A system according to claim 13, further including:

allocation means coupled to the monitoring means for allocating a vacant parking bay to an oncoming vehicle and generating an allocation signal in respect thereof, and invoicing means coupled to the timing means for determining a parking fee in accordance with the measured elapsed time interval.

15. A system according to claim 13, wherein:

the logic means is adapted to compare the computed distance with a third predetermined threshold greater than the first threshold and to generate a third output signal if the computed distance is not less than the first threshold and is less than the third threshold and a fourth output signal if the computed distance is not less than the third threshold;

and there is further provided:

allocation means coupled to the monitoring means for allocating a vacant parking bay to an oncoming vehicle and generating an allocation signal in respect thereof, invoicing means coupled to the timing means for determining a parking fee in accordance with the measured elapsed time interval, a third indication means coupled to the logic means and responsive to the third output signal for indicating to the driver that he should proceed with caution, a fourth indication means coupled to the logic means and responsive to the fourth output signal for indicating to the motorist that he is safe to proceed, and allocation display means coupled to the allocation means and responsive to the allocation signal for indicating to the motorist which parking bay to occupy.

16. A system according to claim 14, wherein:

the parking bays are arranged on a plurality of different levels each having a display monitor coupled to a respective one of said monitoring means for displaying the allocated parking bay, and there is further provided:

a central control system coupled to each of the monitoring means and to the invoicing means for controlling the system, and a central display monitor at an entry level to the system coupled to the central control system for displaying the allocated parking bay.

17. A system according to claim 16, further including:

an entry barrier at the entry level coupled to the central control system, ticket dispensing means coupled to the entry barrier and to the central control system for issuing a ticket to the motorist indicating the allocated parking bay, barrier enabling means for raising the entry barrier after dispensation of said ticket, and barrier disabling means coupled to the central control system for preventing the entry barrier from operating if no parking bays are vacant.

* * * * *